(12) United States Patent
Kang

(10) Patent No.: US 7,440,401 B2
(45) Date of Patent: Oct. 21, 2008

(54) PACKET SCHEDULING METHOD FOR STREAMING MULTIMEDIA DATA

(75) Inventor: Sang Hyuk Kang, Seoul (KR)

(73) Assignee: University of Seoul Industry Cooperation Foundation (KR)

( * ) Notice: Subject to any disclaimer, the term of this patent is extended or adjusted under 35 U.S.C. 154(b) by 474 days.

(21) Appl. No.: 10/527,242

(22) PCT Filed: Dec. 17, 2003

(86) PCT No.: PCT/KR03/02761

§ 371 (c)(1),
(2), (4) Date: Feb. 8, 2005

(87) PCT Pub. No.: WO2004/107755

PCT Pub. Date: Dec. 9, 2004

(65) Prior Publication Data

US 2005/0249226 A1  Nov. 10, 2005

(30) Foreign Application Priority Data

Jun. 3, 2003  (KR) .................. 10-2003-0035467

(51) Int. Cl.
*H04L 12/26* (2006.01)
(52) U.S. Cl. .................. 370/230.1; 370/412
(58) Field of Classification Search .......... 370/230.1, 370/412, 442; 386/46
See application file for complete search history.

(56) References Cited

U.S. PATENT DOCUMENTS 6,611,530 B1 * 8/2003 Apostolopoulos ........ 370/442

2004/0047594 A1 * 3/2004 Towler ................ 386/46
2004/0114516 A1 * 6/2004 Iwata et al. ........ 370/230.1

OTHER PUBLICATIONS

Sujeong Choi, et al., "Substream-based out-of-sequence packet scheduling for streaming stored media", Copyright (C) 2004 Nurimedia Co., Ltd. '04-10 vol. 29 No. 10C, pp. 1469-.
Sang H. Kang et al., "Effective Bandwidth Based Scheduling for Streaming Multimedia" Communication Networks Research Lab. Department of ECE, University of Seoul.

* cited by examiner

*Primary Examiner*—Chirag G Shah
*Assistant Examiner*—Otis L Thompson, Jr.
(74) *Attorney, Agent, or Firm*—Bachman & LaPointe, P.C.

(57) ABSTRACT

The present invention relates, in general, to streaming technology and, more particularly, to a packet scheduling method for streaming multimedia data. The packet scheduling method of the present invention streams multimedia data by a server in a network. The network includes the server for providing multimedia data divided into picture groups each having a sequence of N pictures, and a terminal for displaying the multimedia data received from the server in a streaming manner. In the packet scheduling method, the sequences of the pictures are divided into motion part packets and texture part packets, and priorities are assigned to the packets according to temporal scaling. A threshold for a predetermined priority is determined in consideration of conditions of a channel and a buffer status of the terminal and a substream is constructed using packets with priorities below the threshold within the respective picture groups. The packets in the constructed substream are sequentially transmitted to the terminal.

6 Claims, 17 Drawing Sheets

FIG. 2d

Layer 3(t)    $P_1$  $P_2$  $P_3$  $P_4$  $P_5$  $P_6$  $P_7$

Layer 2(t)    $P_1$  $P_2$  $P_3$  $P_4$  $P_5$  $P_6$  $P_7$

Layer 1(m)    $P_1$  $P_2$  $P_3$  $P_4$  $P_5$  $P_6$  $P_7$

Layer 0(m)  I  $P_1$  $P_2$  $P_3$  $P_4$  $P_5$  $P_6$  $P_7$  I ...

(e) Receiver burrer status(EBS)

(a) Talk show (b) Movie trailer

PACKET SCHEDULING METHOD FOR STREAMING MULTIMEDIA DATA

FIELD OF THE INVENTION

The present invention relates, in general, to streaming technology and, more particularly, to a packet scheduling method for streaming multimedia data.

BACKGROUND ART OF THE INVENTION

Streaming is a technology of processing transmitted data like a continuous flow of water without interruption. With the development of the Internet, streaming technology has become more and more important. The reason for this is that most users do not have high-speed interface lines sufficient to immediately download large capacity multimedia files. By utilizing streaming technology, a client browser or plug-in can begin the display of data even before all the files are transmitted.

Especially, demands for technology of streaming moving picture data have explosively increased on the wired Internet. Therefore, many service providers, such as Internet movie theaters or Internet broadcasting stations, have appeared. Differently from real-time conversation type communication, moving picture data streaming technology is characterized in that picture data to be transmitted is encoded in advance and stored in a server, and the playing of the moving picture data starts after an initial buffering time of approximately 5 through 20 seconds has elapsed when a request for the transmission of the moving picture data is received from a user.

Such streaming data consists of a plurality of packets which have several classes according to influences on service quality when the streaming data are displayed, or preset priorities of data. An operation of determining the classes and transmitting streaming data to clients according to the determined classes by a server is designated as packet scheduling.

There are two reference documents for the above-described streaming data scheduling: 1) 'Markov decision process' disclosed in "Rate-distortion optimized streaming of packetized media" by P. A. Chou and Z. Miao, submitted to IEEE Trans. Multimedia, February 2001 and 2) method disclosed in "Expected run-time distortion based scheduling for delivery of scalable media" by Z. Miao and A. Ortega, submitted to Int'l Packetvideo Workshop 2002, April 2002.

However, since the 'Markov decision process' disclosed in the reference document [1] uses a complicated algorithm, it is difficult to apply the 'Markov decision process' to streaming technology certainly requiring real-time implementation. The method disclosed in the reference document [2] is an algorithm of approximately and experientially calculating an expected value of video quality distortion in real-time, and then transmitting optimum video packets. For this algorithm, it is required to measure packet loss probability in real time. However, there is a problem in that it is difficult to measure the packet loss probability, so that performance of the algorithm is influenced by the precision of the measured packet loss probability.

SUMMARY OF THE INVENTION

Accordingly, the present invention has been made keeping in mind the above problems occurring in the prior art, and an object of the present invention is to provide a packet scheduling method for streaming multimedia data, which can solve the above problems in which it is difficult to apply a conventional 'Markov decision process' to streaming technology certainly requiring real-time implementation, and the performance of a conventional scheduling algorithm is influenced by the precision of a measured packet loss probability.

Another object of the present invention is to provide a packet scheduling method, which can improve the service quality of a streaming data service.

A further object of the present invention is to provide a packet scheduling method, which can obtain improved performance in consideration of a channel environment and the size of a receiver buffer.

In order to accomplish the above object, the present invention provides a packet scheduling method for streaming multimedia data by a server in a network, the network including the server for providing multimedia data divided into picture groups each having a sequence of N pictures and a terminal for displaying the multimedia data received from the server in a streaming manner, the method comprising the steps of dividing N-1 P-frames into motion part packets and texture part packets, and assigning priorities to the packets according to temporal scaling, determining a threshold for a predetermined priority in consideration of conditions of a channel and a buffer status of the terminal and constructing a substream using packets with priorities below the threshold within the respective picture groups, and sequentially transmitting the packets in the constructed substream to the terminal.

BRIEF DESCRIPTION OF THE DRAWINGS

The above and other objects, features and other advantages of the present invention will be more clearly understood from the following detailed description taken in conjunction with the accompanying drawings, in which:

FIGS. 2a to 2d are views showing temporal scaling and a layer structure of priorities according to the present invention;

DETAILED DESCRIPTION OF THE INVENTION

Figure 1:
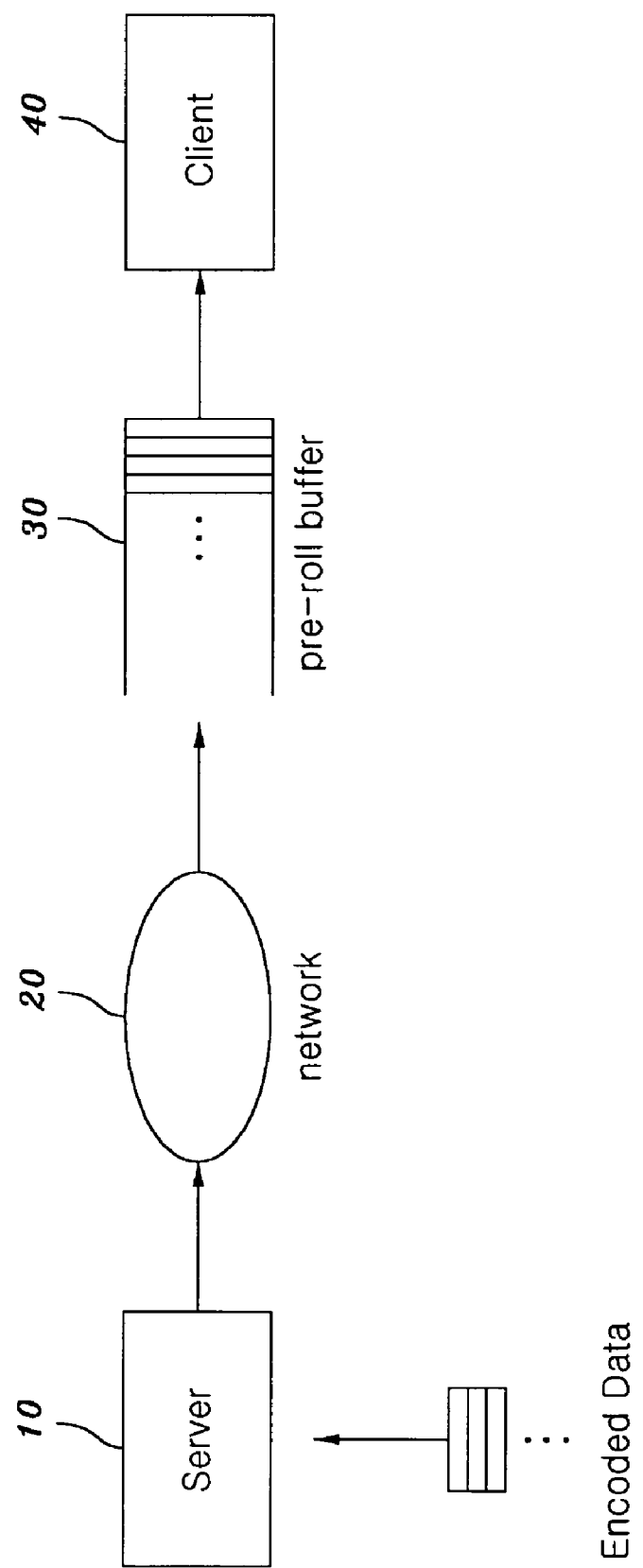
FIG. 1 is a view showing the construction of a network to which a packet scheduling method according to an embodiment of the present invention is applied.

Hereinafter, embodiments of the present invention will be described in detail with reference to the attached drawings. Reference now should be made to the drawings, in which the same reference numerals are used throughout the different drawings to designate the same or similar components. In this specification, a detailed description of related prior art or constructions will be omitted if the detailed description makes the gist of the present invention unclear.

FIG. 1 is a view showing the construction of a network to which a packet scheduling method according to an embodiment of the present invention is applied. Referring to FIG. 1, a streaming data providing server 10 transmits encoded data to a pre-roll buffer 30 connected to a client 40 through a network 20, such as the Internet. The buffer 30 provides the received data to the client 40 by a preset method. The client 40 decodes and displays the data.

Related terms required for a later description of the present invention are summarized in the following Table 1.

TABLE 1

| Picture group | Group Of Pictures (GOP) |
|---|---|
| Sequence of pictures | Packets or frames constituting GOP, in which one GOP includes one independently decoded I-frame and N-1 P-frames decoded with reference to previous data |
| Motion Texture Discrimination (MTD) | Method of dividing respective frames of a sequence of pictures into a motion vector part and a texture part and assigning priority thereto. Hereinafter, a motion vector is referred to as a motion. |
| Temporal scaling | Method of decreasing temporal resolution of a video bit stream by reducing the number of video frames transmitted within a given time. That is, packets constituting one GOP can be classified into important packets and less important packets at the time of encoding, and a reception terminal can decode only important packets to display multimedia data. |
| Substream | Concept of substream proposed in the present invention means a sequence of packets reconstructed using packets having priorities determined by a predetermined algorithm, which will be described later, in each GOP. |
| Earliest Deadline First (EDF) | EDF means that an earlier packet is transmitted first. Hereinafter, EDF is referred to as "earliest packet first" transmission. |
| Receiver | Client terminal provided with a multimedia streaming service from a certain server |
| Video rate | Value obtained by dividing the size of entire video data by a playing time. For example, if there are moving pictures corresponding to 60 seconds and the size of entire moving picture data is 12 megabits, a video rate is 12 Mbits/60 seconds = 200,000 bps. |

Hereinafter, the temporal scaling and the priority layer structure according to the present invention will be described in detail. Next, a scheduling method of constructing a substream will be described. Then, experimental results obtained by the application of the present invention will be described.

A. Scaling and Priority Layer Structure

FIGS. 2a to 2d are views showing the scaling and the priority layer structure according to the present invention. Hereinafter, the scaling and the layer structure are described with reference to FIGS. 2a to 2d.

If it is assumed that there is a video frame sequence Fn (n=0, 1, 2, . . . ) with a frame rate f, a data receiver displays received data at time t=0 sec, and a total display time is t=n/f sec. Such a video frame sequence consists of a plurality of picture groups (hereinafter referred to as GOPs). A j-th P frame in a GOP is designated as $P_j$ (j=1, 2, . . . , N−1).

Figure 2A:

FIG. 2a shows a case where frames constituting a GOP are not scaled.

Figure 2B:
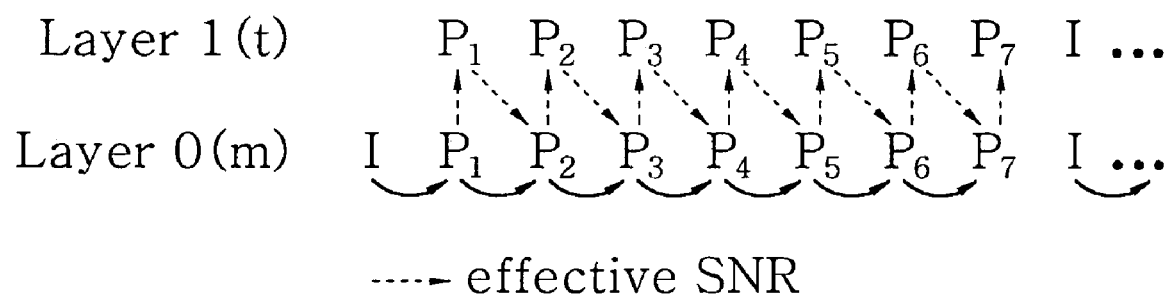

FIG. 2b shows a MTD method, in which respective frames are divided into a motion part and a texture part, so that I-frames and the motion part of P-frames form a layer 0, and the texture part of the P-frames forms a layer 1. In this case, the layer 0 is a basic layer having a priority higher than the layer 1, which is an enhancement layer.

Figure 2C:
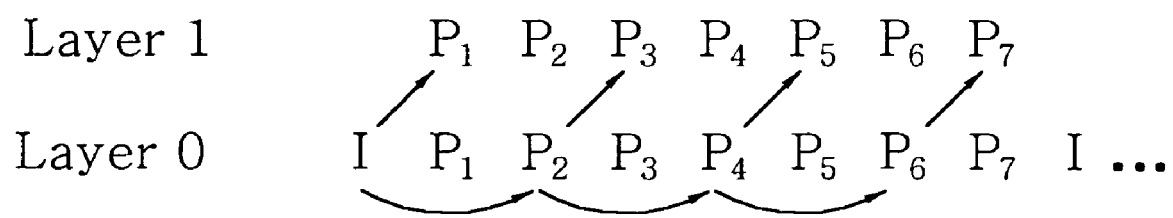

FIG. 2c shows a two-layer temporal scaling scheme. Referring to FIG. 2c, a layer 0 is composed of I-frames and even-numbered P-frames of a picture sequence, and a layer 1 is composed of odd-numbered P-frames thereof.

FIG. 2d shows a layer structure of a combination of the MTD and the temporal scaling. Referring to FIG. 2d, a layer 0 is composed of I-frames and a motion part of even-numbered P-frames of a picture sequence. A layer 1 is composed of a motion part of odd-numbered P-frames of the picture sequence. A layer 2 is composed of a texture part of the even-numbered P-frames thereof. Finally, a layer 3 is composed of a texture part of the odd-numbered P-frames thereof.

In the above layer structure, if the priority or importance level is h=0, 1, . . . , H−1, h=0 represents highest priority. Therefore, as the layer becomes lower, the priority becomes higher. In the same layer, as an index number of a frame becomes lower, the priority becomes higher.

B. Scheduling Method

A principle of the scheduling method of the present invention determines a variable θ according to a predetermined algorithm with conditions of a channel and buffer status of a terminal taken into consideration, and constructs a substream using packets with higher priorities within GOPs using the determined variable θ.

Data in each importance level within a GOP is segmented into fixed-size packets. A random process $\{X_i^{(h)}; i=0, 1, \ldots\}$ is defined to be the sequence of the size. In this case, the random process represents the sequence of the size of data with importance level h in an i-th GOP of consecutive GOPs. Further, the characteristics of the random process are assumed to be Wide Sense Stationary (WSS). Further, the cumulative sum $S_i^{(\theta)}$ (θ=0, 1, . . . , H−1) of the random process is defined as the following Equation [1].

$$S_i^{(h)} = \sum_{j=0}^{h} X_i^{(j)} \qquad [1]$$

Further, autocovariance of $S_i^{(\theta)}$ is defined as the following Equation [2], $$V[k]=E[(S_i^{(h)}-\overline{S}^{(h)})(S_{i+k}^{(h)}-\overline{S}^{(h)})] \qquad [2]$$

where k=0, 1, . . . .

Figure 3:
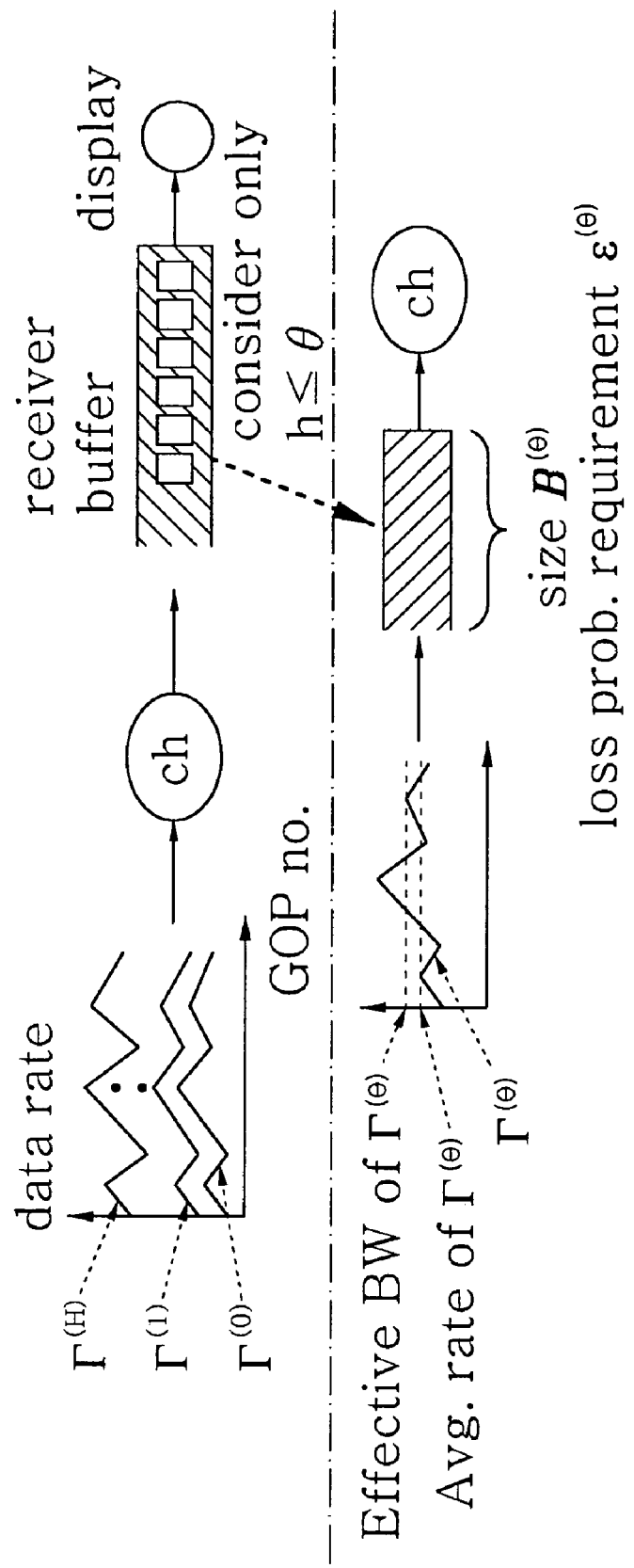
FIG. 3 is a view showing a queuing model according to the present invention.

FIG. 3 is a view showing a queuing model according to the present invention.

An upper part of FIG. 3 shows the status of a buffer of a receiver, and a lower part of FIG. 3 shows a queuing model indicated in consideration of the status of the receiver buffer. In FIG. 3, Ch represents a channel, which can be, for example, the wired/wireless Internet.

If a substream proposed in the present invention is assumed to be $\Gamma^{(\theta)}$, each GOP is composed of data with importance levels h=0 through h=θ, for the entire video sequence. Further, if the length of a GOP is 1 sec, the size of data of an i-th GOP in the substream is represented by $S_i^{(\theta)}$, and an average data rate of the substream $\Gamma^{(\theta)}$ is represented by $E[S_i^{(\theta)}]$ in packets/sec. Next, the queuing model shown in FIG. 3 is introduced for the substream $\Gamma^{(\theta)}$. In this case, the queuing model has the stochastic substream $\Gamma^{(\theta)}$ as an input process, an output service rate equal to a channel bandwidth C, and a fixed-size buffer with a size $B^{(\theta)}$. The buffer size $B^{(\theta)}$ must be carefully determined in consideration of the buffer status of the receiver. Especially, the $B^{(\theta)}$ is represented by the number of packets according to the average data rate of the substream $\Gamma^{(\theta)}$, and is related to a pre-roll duration for the substream $\Gamma^{(\theta)}$ in the receiver buffer.

The $B^{(\theta)}$ is calculated by Equation [3], $$B^{(\theta)}=(m_{74}-k)E[S^{(\theta)}][\text{packets}] \qquad [3]$$

where both $m_\theta$ and k represent GOP numbers. If a GOP is composed of 16 frames I+15 P, GOP numbers may be assigned in such a way that a first GOP is designated as GOP 0 and a GOP next to the GOP 0 is designated as GOP 1. A variable k represents a situation in which a video player of a receiver plays a certain frame at the present time and this frame is a frame of a GOP k. Further, $m_\theta$ represents a GOP number, indicating the amount of data to later be played, which is prestored in the receiver buffer. Therefore, $m_\theta$ is a value greater than k. If there are no data in the receiver buffer at the present time, $m_\theta$ has a value equal to k. If there are data corresponding to a GOP in the receiver buffer at the present time, $m_\theta$ has a value equal to k+1. More specifically, $m_\theta$ is determined to be a largest GOP number of GOPs for which all packets with importance level θ have been satisfactorily transmitted to the receiver without error. Further, if the playing of the video signals starts once by the receiver, the frames are played at a constant speed according to a given frame per second value, which also means that GOPs are played at a constant speed. Therefore, GOP numbers $m_\theta$ and k are analyzed with respect to time.

In Equation [3], $B^{(\theta)}$ is determined in consideration of only a case where an importance level is equal to or less than θ. That is, if a GOP duration is 1 second, the receiver has a queuing time of a length $m_\theta - k$.

In the queuing model shown in the lower part of FIG. 3, the average data rate $E[S_i^{(\theta)}]$ of the substream $\Gamma^{(\theta)}$ is less than a channel bandwidth C, and the input process suffers from packet losses due to video rate fluctuations. In order to apply the concept of effective bandwidth to the problem of the packet losses, a packet loss probability $\epsilon_p^{(\theta)}$ of the substream $\Gamma^{(\theta)}$ is defined as Equation [4], $$\epsilon_p^{(\theta)} = e^\beta \quad [4]$$

where β is defined as Equation [5].

$$\beta = \frac{-2B^{(\theta)}(C - E[S^{(\theta)}])}{\sum_k v^\theta[k]} \quad [5]$$

Relationships between the above-described probability functions are described below. First, if $B^{(\theta)}$ decreases or the video rate fluctuations become large, the packet loss probability $\epsilon_p^{(\theta)}$ increases. Further, the average data rate $E[S_i^{(\theta)}]$ of the substream $\Gamma^{(\theta)}$ increases, the packet loss probability $\epsilon_p^{(\theta)}$ increases. However, the packet loss probability $\epsilon_p^{(\theta)}$ must be within a range of [0, 1] and the average data rate $E[S_i^{(\theta)}]$ must be smaller than the channel bandwidth C.

In the substream $\Gamma^{(\theta)}$, a decoding failure due to the packet loss of any one motion part within a GOP is defined to be $\epsilon_G^{(\theta)}$ as probability. That is, in the queuing model, the decoding failure probability $\epsilon_G^{(\theta)}$ for the substream $\Gamma^{(\theta)}$ is defined as Equation [6].

$$\varepsilon_G^{(\theta)} = \begin{cases} \varepsilon_p^{(\theta)} E[S^{(\theta)}], & \theta \leq N-1 \\ \varepsilon_p^{(\theta)} E[S^{(N-1)}], & \theta > N-1 \end{cases} \quad [6]$$

It can be seen from the queuing theory that the decoding failure probability $\epsilon_G^{(\theta)}$ is a monotonically increasing function of θ. In the scheduling method, the decoding failure probability $\epsilon_G^{(\theta)}$ of the GOP is compared with a requirement value (or threshold value) specified by a user so as to obtain an optimum θ.

If the decoding failure probability $\epsilon_G^{(\theta)}$ must be less than an arbitrary value γ, the server determines an optimum importance level $\theta_o$ by the following Equation [7] in the given channel bandwidth C.

$$\theta_o = \text{argmax}_{74}\{\epsilon_G^{(\theta)} < \gamma, E[S^{(\theta)}]\} < C \quad [7]$$

As shown in Equation [7], the optimum importance level is the largest value of the θ values such that the decoding failure probability $\epsilon_G^{(\theta)}$ is less than the arbitrary value γ, while keeping an average bit rate below the channel bandwidth C. Due to the limitation of the channel bandwidth, the packet loss probability $\epsilon_G^{(\theta)}$ must be within the range of [0, 1], as described above. In an ideal case, $\theta_o$ is an integer, and, thus, the server sets the optimum importance level to be changed between $\theta_o$ and $\theta_o+1$ so as to regulate the receiver buffer and maximize the utilization of the channel bandwidth. Especially, a time spent at $\theta_o$ versus $\theta_o+1$ relates to the marginal capacity of the receiver buffer. If there is no marginal capacity in the receiver buffer, $\theta_o+1$ is selected, while if there is any marginal capacity, $\theta_o$ is selected. That is, if there are many packets stored in the receiver buffer, it is determined that the channel status is superior, while if there are few packets stored in the receiver buffer, it is determined that the channel status is inferior.

If $\theta_o$ is determined, importance levels are divided into two priorities. A high priority part represents a part with importance levels h=0 through h=$\theta_o$. A low priority part represents a part with importance levels h=$\theta_o$+1 through h=H-1. In this case, packets with a high priority are scheduled to be transmitted first, and the packets with a relatively low priority are scheduled to be transmitted next. Within each priority, packets are transmitted according to an Earliest to Deadline First (EDF) manner.

In the scheduling method according to the present invention, the receiver periodically measures throughput and reports the measured throughput to the server so as to take time-varying channel fluctuations and queue status in the receiver buffer into consideration. The server, having received the measured throughput from the receiver, calculates mean throughput by Exponentially Weighted Moving Average (EWMA) as expressed in Equation [8], $$C \leftarrow aC + (1-a)Y_m \quad [8]$$

where 0<a<1 is satisfied, and $Y_m$ is newly reported throughput by the receiver. For a packet switching network, a sending rate is calculated to be suitable for Transmission Control Protocol (TCP). At this time, the measurement of the packet loss probability and Round Trip Time (RTT) is required.

In order to calculate the variability of channel throughput (or channel capacity), the server calculates the variance $\sigma_Y^2$ of the $Y_m$. Therefore, if channel fluctuation, that is, the variance $\sigma_Y^2$ increases, the display quality at the receiver will be further degraded. Further, since the channel fluctuations and video rate fluctuations are statistically independent, a value β required to calculate the packet loss probability may be defined as Equation [9].

$$\beta = \frac{-2B^{(\theta)}(C - E[S^{(\theta)}])}{\sum_k v^\theta[k] + \sigma_Y^2} \quad [9]$$

The server calculates the packet loss probability by applying Equation [9] to the above Equation [4].

Figure 4:
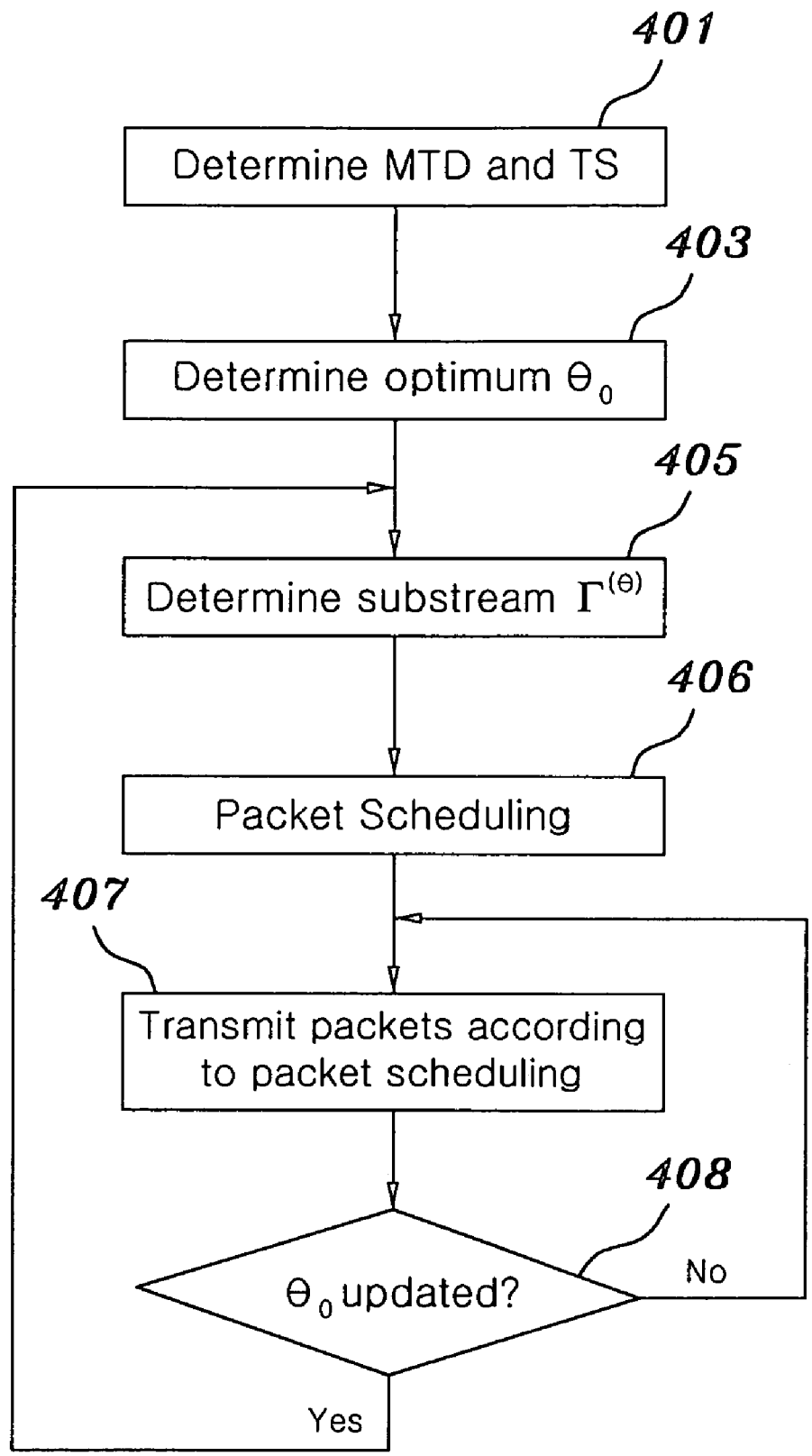
FIG. 4 is a flowchart of a packet scheduling method according to an embodiment of the present invention.

FIG. 4 is a flowchart of a packet scheduling method according to an embodiment of the present invention. The method, which will be described below, is performed by the server 10.

Referring to FIG. 4, the above temporal scaling (TS) and the layer structure for dividing respective frames into motion and texture parts are determined at step 401. An optimum importance level $\theta_o$ satisfying Equations [1] through [9] is determined at step 403. A substream $\Gamma^{(\theta)}$ is determined according to the determined optimum importance level $\theta_o$ at step 405. The substream is constructed (packet scheduling) at step 406, and the transmission of the packets is started depending on the packet scheduling at step 407. The construction of the substream and the transmission of the packets will be described later. As described above, the receiver periodically measures throughput and reports the measured throughput to the server so that time-varying channel fluctuations and the queue status of the receiver buffer are taken into consideration. The server obtains the optimum importance level $\theta_o$ through Equations [7] through [9] in consideration of the measured throughput, and determines whether to update the optimum importance level $\theta_o$ at step 408. If it is determined that the optimum importance level $\theta_o$ is updated, the server returns to step 405 to repeatedly perform steps 405, 406 and 407 using the updated optimum importance level $\theta_o$.

Figure 5:
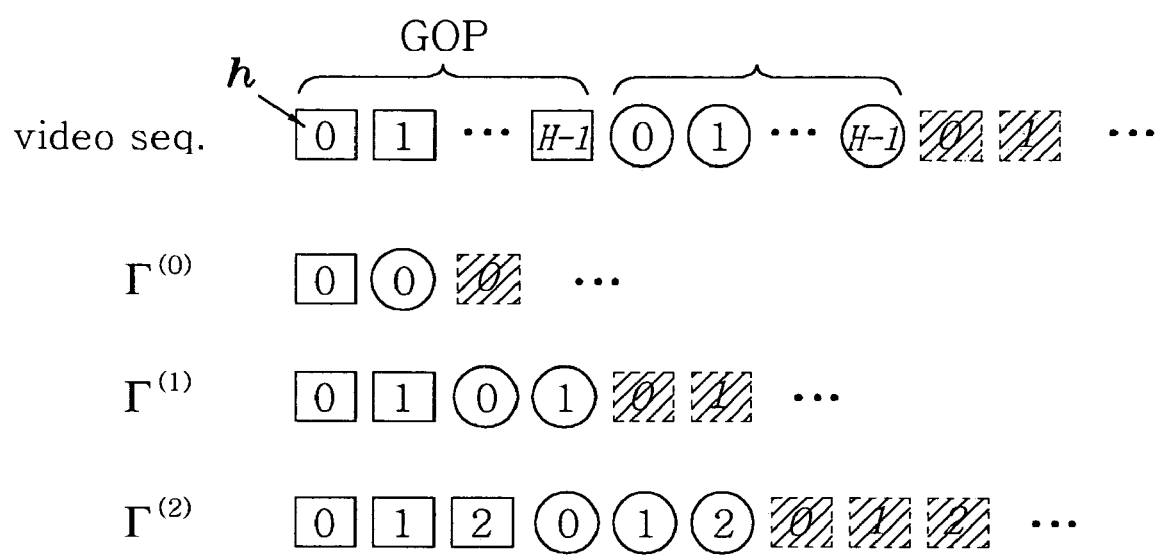
FIG. 5 is a view showing an example of the construction of a substream according to the present invention.

FIG. 5 is a view showing an example of the construction of a substream according to the present invention.

Referring to FIG. 5, a video sequence is composed of sequential GOPs. First, if $\theta_o$ is 0, a substream is composed of packets with importance level h=0 within respective GOPs, in which the packets are scheduled in order in such a way that a packet of an earlier GOP is arranged first. Next, if $\theta_o$ is 1, the substream is composed of packets with importance levels h=0 and h=1 within the respective GOPs, in which the packets are scheduled in such a way that packets of an earlier GOP are arranged first with a packet with higher importance level h=0 being arranged first. Next, if $\theta_o$ is 2, the substream is composed of packets with importance levels h=0, h=1 and h=2 within the respective GOPs, in which the packets are scheduled in such a way that packets of an earlier GOP are arranged first with a packet with higher importance level h=0 being arranged first.

Figure 6:
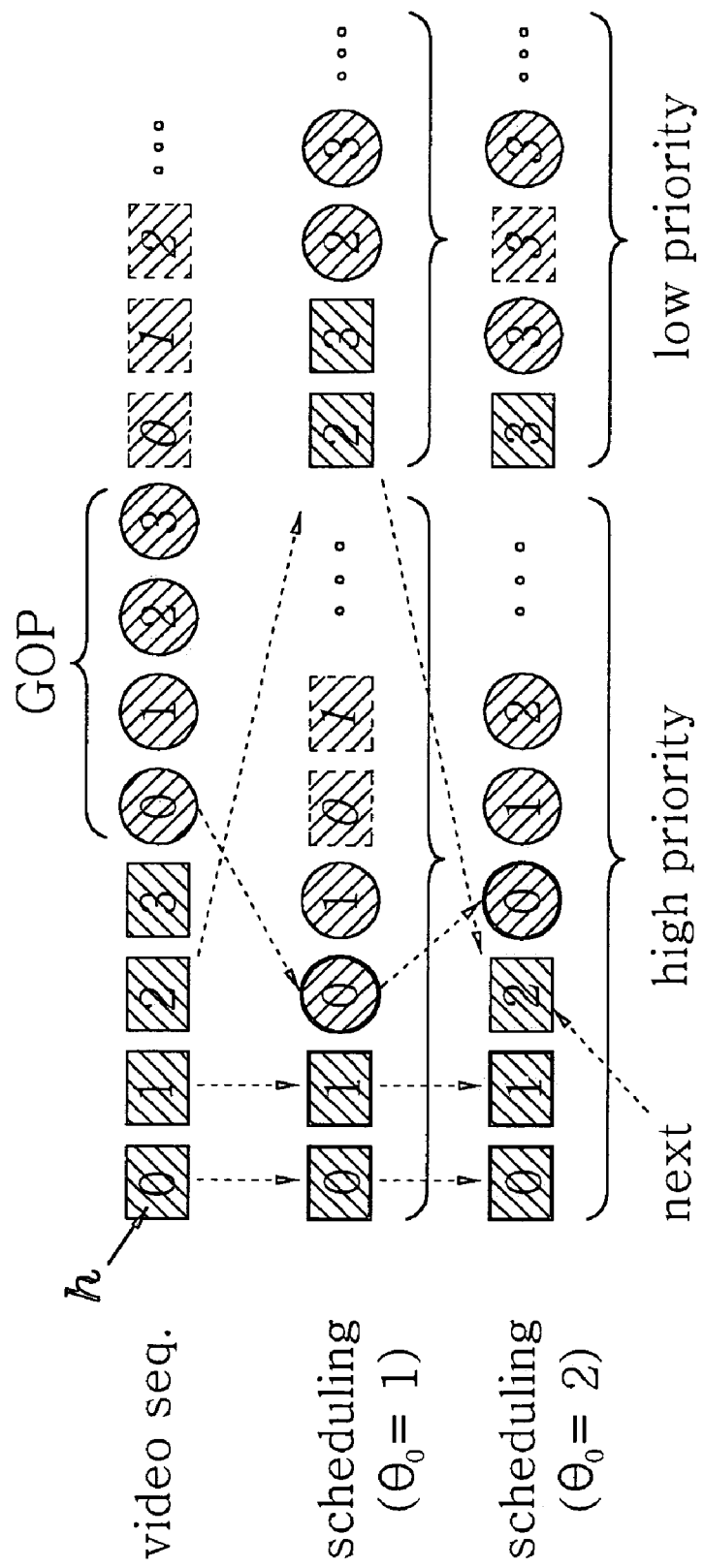
FIG. 6 is a view showing an example of the packet scheduling of the present invention.

FIG. 6 is a view showing an example of the packet scheduling of the present invention.

As described above, $\theta_o$ is a periodically updated value, so that, if $\theta_o$ is updated to 2 from 1 after packets with importance levels h=0 and h=1 are transmitted, the substream is scheduled as in the case of $\theta_o$=2 shown in FIG. 6, and a packet with importance level h=2 is first transmitted in a next round.

C: Experimental Data

Experimental conditions of the scheduling method according to the present invention are described below.

Transmission of real video data (a talk show with 1670 frames and a movie with 1700 frames) through wireline and wireless channels Quarter Common Intermediate Format (QCIF), 15 frames/sec Using User Datagram Protocol (UDP) as protocol Receiver buffer having pre-roll buffering time of 10 sec Moving Picture Experts Group (MPEG)-4 codec GOP=16 frames (1 I-frame and 15 P-frames)

Wireline network: between Korea Advanced Institute of Science and Technology (KAIST) of Korea and University of California, Berkeley, with artificial error added Wireless network: IEEE 802. 11

Figure 7:
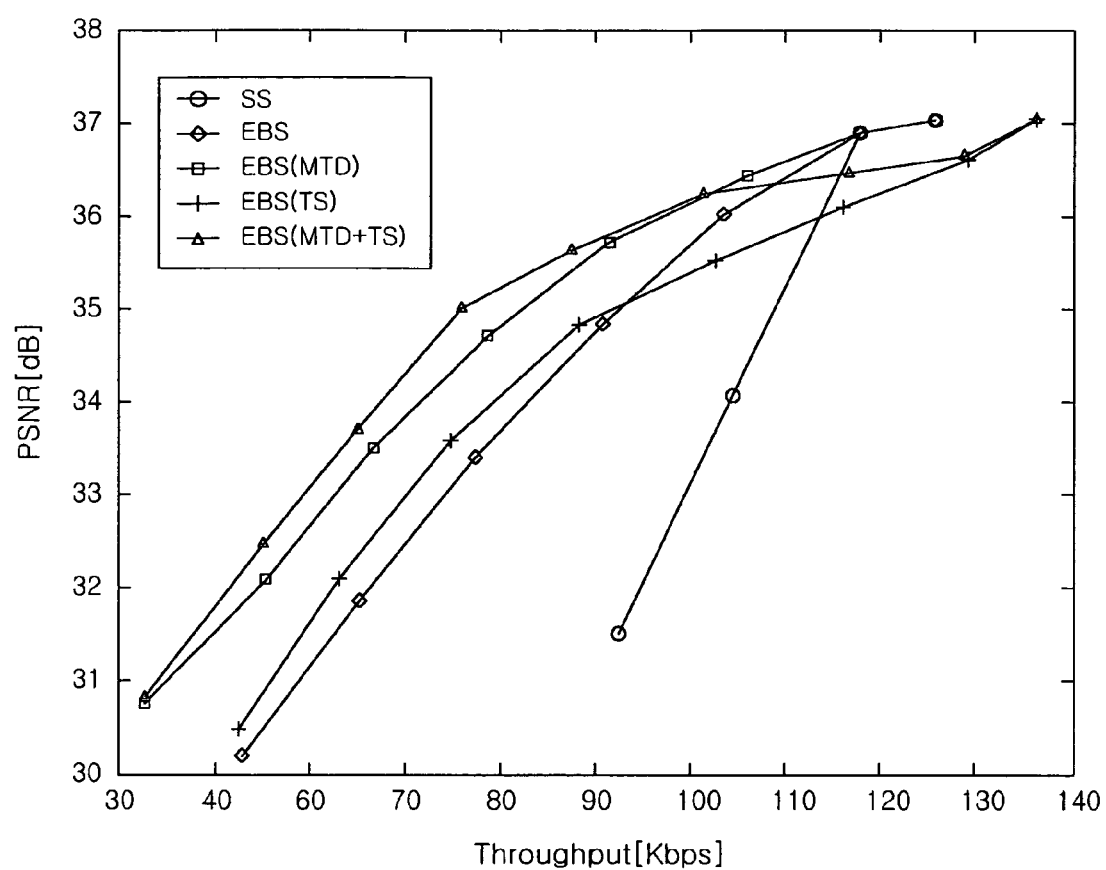
FIG. 7 is a view showing result values obtained by applying the packet scheduling method of the present invention to a wireline network.

FIG. 7 is a view showing result values obtained by applying the packet scheduling method of the present invention to a wireline network. Referring to FIG. 7, SS represents typical sequential sending, EBS represents effective bandwidth scheduling, EBS (MTD) represents a case where differential priorities are assigned to motion and texture parts of the present invention, EBS (TS) represents a case where the temporal scaling of the present invention is applied to the wireline network, and EBS (MTD+TS) represents a case where the motion and texture parts of the present invention are discriminated and the temporal scaling is applied to the wireline network. It can be seen that the EBS (MTD+TS) outperforms all other schemes at channel throughputs below 95 Kbps.

FIGS. 8a to 8e are views showing another example of result values obtained by applying the packet scheduling method of the present invention to the wireline network. FIGS. 8a to 8e illustrate the results obtained by comparing the SS with the EBS (MTS+TS).

Figure 8A:
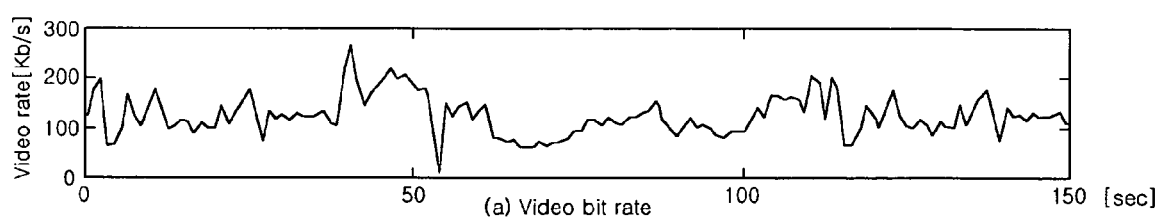
FIGS. 8a to 8e are views showing another example of result values obtained by applying the packet scheduling method of the present invention to the wireline network.
Figure 8B:
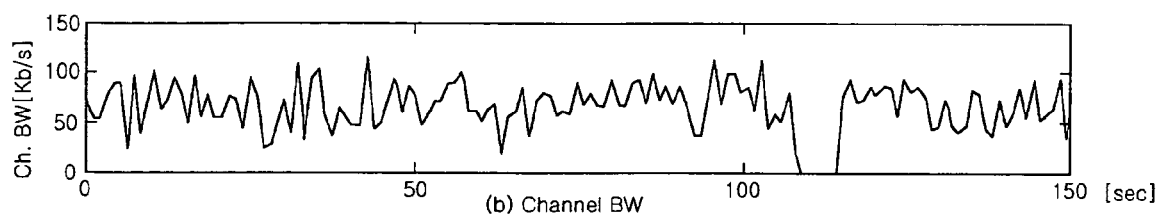
Figure 8C:
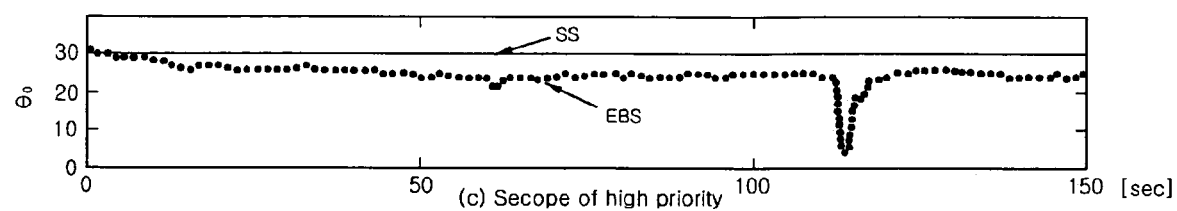
Figure 8D:
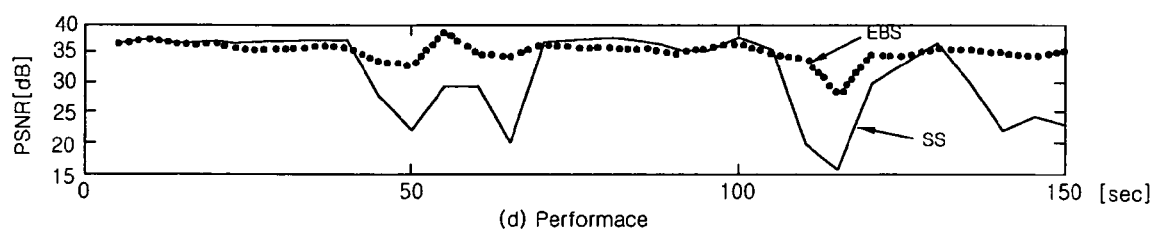
Figure 8E:
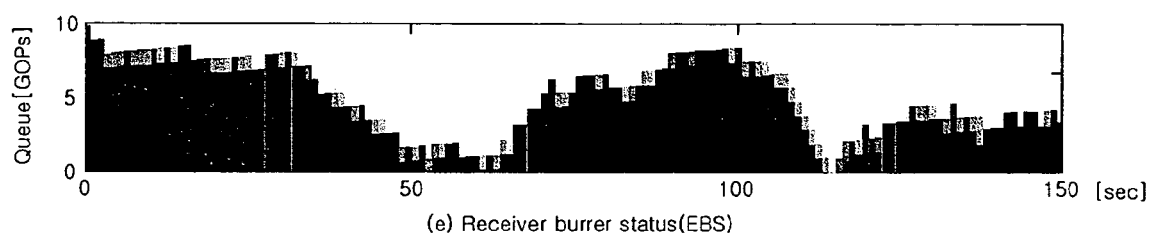

Referring to FIGS. 8a to 8e, FIG. 8a shows a video bit rate and FIG. 8b shows a channel bandwidth (BW). Referring to FIG. 8c, in the case of the SS scheme, an importance level $\theta_o$ is fixed to 30, but, in the case of the EBS (MTD+TS) scheme, the importance level $\theta_o$ is adaptively varied according to the fluctuations of a channel capacity and the status of the receiver buffer. FIG. 8d is a view comparing the performance of both the SS and EBS schemes, in which, in the case of the SS scheme, performance is greatly deteriorated if the video bit rate is rapidly increased or a channel error becomes heavy. The performance of the two schemes, compared with each other in terms of Peak Signal to Noise Ratio (PSNR) [dB], shows that an average PSNR of the EBS (MTD+TS) scheme is higher than that of the SS scheme by 4.2. FIG. 8e shows the status of the receiver buffer in the case where the EBS (MTD+TS) scheme is applied to the wireline network.

Figure 9A:
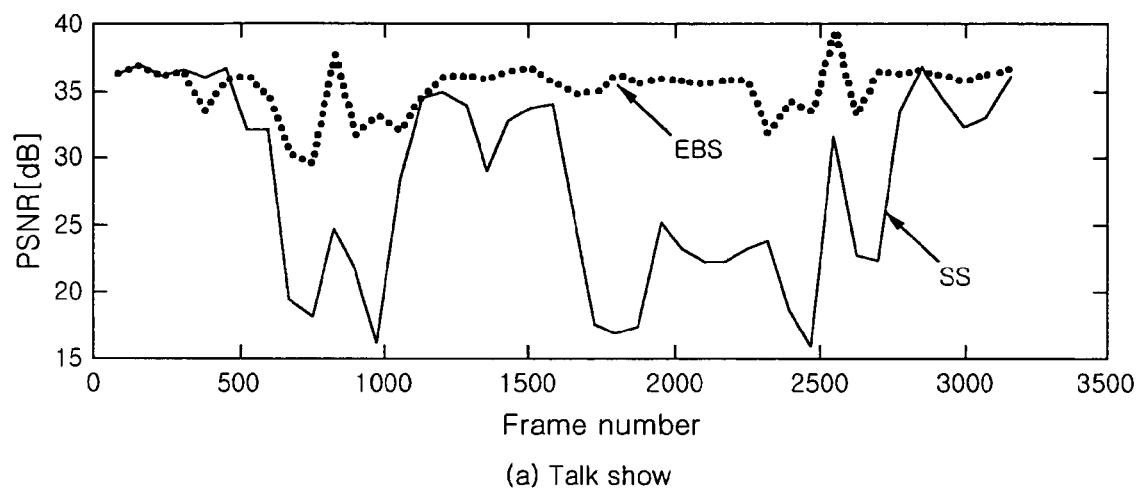
FIGS. 9a and 9b are views showing result values obtained by applying the packet scheduling method of the present invention to a wireless network.
Figure 9B:
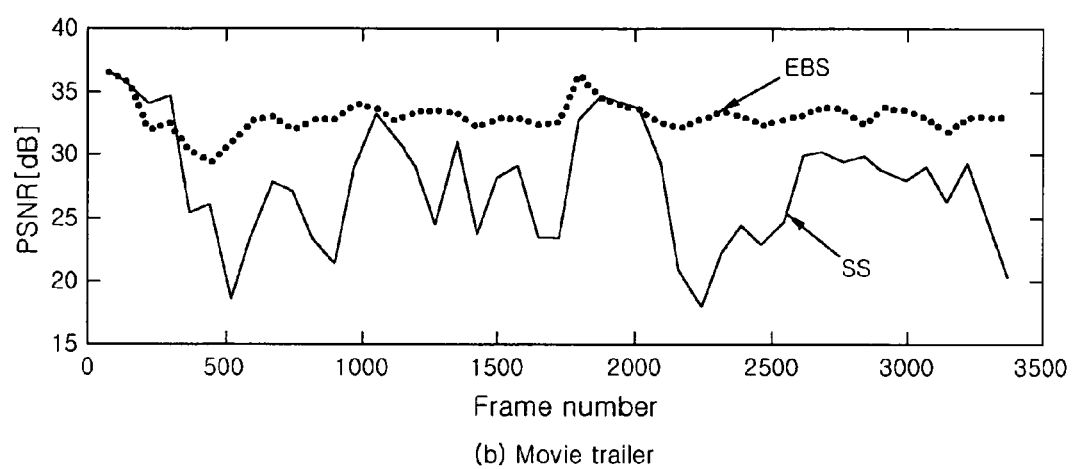

FIGS. 9a and 9b are views showing result values obtained by applying the packet scheduling method of the present invention to a wireless network. FIG. 9a shows the transmission of a talk show, in which the average PSNR of the EBS (MTD+TS) scheme is higher than that of the SS scheme by 8.8.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the number of frames within each GOP and the determination of an important frame for temporal scaling can be modified. Therefore, the scope of the present invention cannot be limited to the above embodiments, and must be defined by the equivalents of the following claims as well as the following claims.

INDUSTRIAL APPLICABILITY

As described above, the present invention provides a packet scheduling method for streaming multimedia data, which is based on an effective bandwidth and can be applied to a streaming service with an improved quality.

What is claimed is:

1. The packet scheduling method for streaming multimedia data by a server in a network, the network including the server for providing multimedia data divided into picture groups each having a sequence of N pictures and a terminal for displaying the multimedia data received from the server in a streaming manner, the method comprising the steps of:

dividing the sequences of the pictures into motion part packets and texture part packets, and assigning priorities to the packets according to temporal scaling;

determining a threshold $\theta_o$ for a predetermined priority in consideration of conditions of a channel and a buffer status of the terminal and constructing a substream using packets with priorities below the threshold $\theta_o$ within the respective picture groups; and sequentially transmitting the packets in the constructed substream to the terminal, wherein the threshold $\theta_o$ for the predetermined priority is determined by the following equation:

$$\theta_o = \mathrm{argmax}_\theta \{\epsilon_G^{(\theta)} < \gamma, E[S^{(\theta)}]\} < C$$

where $\theta$ is 0, 1, . . . and is equal to a number of packets to which priorities are assigned, $\gamma$ is a threshold of a preset decoding failure probability, $\epsilon_G^{(\theta)}$ is the decoding failure probability, $E[S^{(\theta)}]$ is an average data rate of the substream, and C is a channel bandwidth.

2. The packet scheduling method for streaming multimedia data by a server in a network, the network including the server for providing multimedia data divided into picture groups each having a sequence of N pictures and a terminal for displaying the multimedia data received from the server in a streaming manner, the method comprising the steps of:

dividing the sequences of the pictures into motion part packets and texture part packets, and assigning priorities to the packets according to temporal scaling;

determining a threshold $\theta_o$ for a predetermined priority in consideration of conditions of a channel and a buffer status of the terminal and constructing a substream using packets with priorities below the threshold $\theta_o$ within the respective picture groups; and sequentially transmitting the packets in the constructed substream to the terminal, wherein the packets received by the terminal have a loss rate of $\epsilon_p^{(\theta)}$ calculated by the following Equations:

$$\epsilon_p^{(\theta)} = \epsilon^\beta;$$

$$\beta = \frac{-2B^{(\theta)}(C - E[S^{(\theta)}])}{\sum_k v^\theta[k]}; \text{ and}$$

$$\varepsilon_G^{(\theta)} = \begin{cases} \varepsilon_p^{(\theta)} E[S^{(\theta)}], & \theta \leq N-1 \\ \varepsilon_p^{(\theta)} E[S^{(N-1)}], & \theta > N-1 \end{cases}.$$

3. The packet scheduling method for streaming multimedia data by a server in a network, the network including the server for providing multimedia data divided into picture groups each having a sequence of N pictures and a terminal for displaying the multimedia data received from the server in a streaming manner, the method comprising the steps of:

dividing the sequences of the pictures into motion part packets and texture part packets, and assigning priorities to the packets according to temporal scaling;

determining a threshold $\theta_o$ for a predetermined priority in consideration of conditions of a channel and a buffer status of the terminal and constructing a substream using packets with priorities below the threshold $\theta_o$ within the respective picture groups; and sequentially transmitting the packets in the constructed substream to the terminal, wherein the packets received by the terminal have a loss rate of $\epsilon_p^{(\theta)}$ calculated in consideration of a variance of a channel bandwidth by the following equations:

$$\epsilon_p^{(\theta)} = \epsilon^\beta;$$

$$\beta = \frac{-2B^{(\theta)}(C - E[S^{(\theta)}])}{\sum_k v^\theta[k] + \sigma_Y^2}; \text{ and}$$

$$\varepsilon_G^{(\theta)} = \begin{cases} \varepsilon_p^{(\theta)} E[S^{(\theta)}], & \theta \leq N-1 \\ \varepsilon_p^{(\theta)} E[S^{(N-1)}], & \theta > N-1 \end{cases}.$$

4. The packet scheduling method according to claim 1, 2 or 3 wherein the motion part packets are assigned priorities higher than those of the texture part packets.

5. The packet scheduling method according to claim 1, 2 or 3 wherein the priorities of the packets are assigned so that an I-frame and a motion part of even-numbered P-frames of each picture sequence are assigned a highest priority and a texture part of odd-numbered P-frames of each picture sequence is assigned a lowest priority.

6. The packet scheduling method according to claim 1, 2 or 3 wherein the threshold for the predetermined priority is updated according to variations of data throughput periodically reported from the terminal.

\* \* \* \* \*